United States Patent Office 3,776,842
Patented Dec. 4, 1973

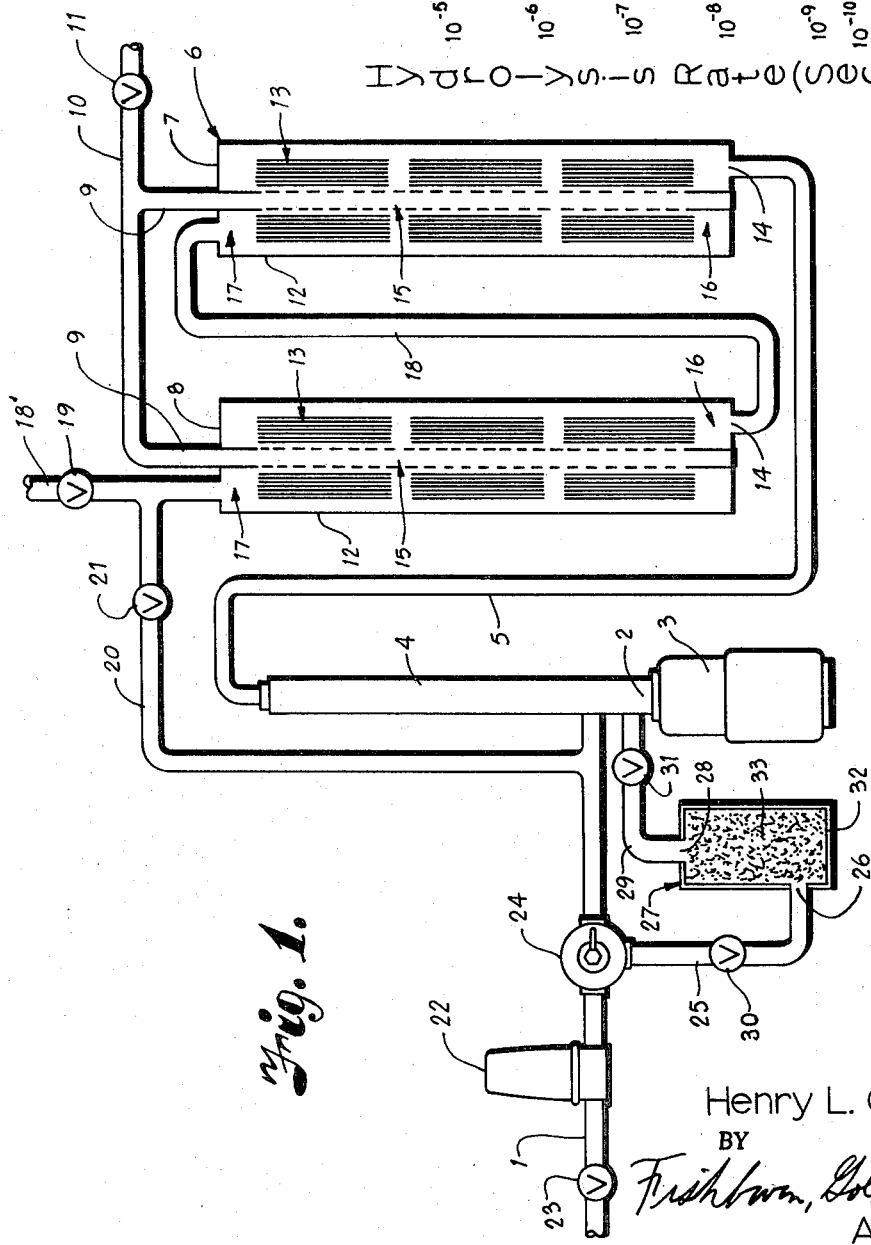

3,776,842
WATER CLEANING TREATMENT
Henry L. Grimme, Jr., Parkville, Mo., assignor to
Raypak, Inc., Westlake Village, Calif.
Filed Mar. 8, 1971, Ser. No. 121,935
Int. Cl. B01d 13/00
U.S. Cl. 210—23
1 Claim

ABSTRACT OF THE DISCLOSURE

A treatment of water having alkaline earth metals and a pH above 7 wherein the pH of the feed water is controlled and reduced to desired limits by dividing the feed water flow and substituting hydrogen ions for some alkaline earth metal ions by contacting said one portion of the feed water with a cation exchange media. Returning the contacted feed water portion with the hydrogen ions to the other portion of the feed water stream to combine same and then passing said combined feed water under pressure over one side of cellulose acetate membranes and removing clean water from the opposite side of said membranes.

---

This invention relates to the production of clean water by pressure passage of same through a membrane which rejects or prevents passage of impurities such as dissolved minerals, detergents, organic material, bacteria and other pollutants.

Cellulose acetate membranes prepared as described in U.S. Pats. Nos. 3,133,132 and 3,132,137 of Loeb et al., both dated May 12, 1964, have been used for pressure filtration of water; however, heretofore, the use has been limited because of rapid degradation by hydrolysis in alkaline solutions. Most natural waters are alkaline and in the use of cellulose acetate membranes for pressure filtration there is loss of effectiveness of the membranes after a relatively short period of use, as for example, within a month or two, depending upon the degree of use and alkalinity of the water. Attempts have been made to increase the effective life of the acetate membranes by reducing the pH of the water prior to filtering by the addition of acid to said water. This method also presents difficulties as the pH in the natural waters can vary considerably and to have any success it has been necessary to use an acid metering pump with a continuous pH control which results in a high initial cost, supply and maintenance cost resulting in an increased water cost that is prohibitive for ordinary general use.

The principal objects of the present invention are to provide a method of water cleaning treatment, where the pH control of feed water substantially reduces the hydrolysis of the acetate membranes and thereby prolongs the effective life thereof; to provide the method of water cleaning treatment in which the pH of the feed water is reduced to below 7.0 by dividing the feed water stream and contacting a portion thereof to substitute hydrogen ions for alkaline earth metals therein and re-combining the portions of the feed water stream for passage under pressure over one side of the cellulose acetate membrane with the removal of clean water from the opposite side thereof; to provide such a method of water treatment wherein the hydrogen ion substitution is by contacting said water portion with a cation exchange media; to provide such a water treating method wherein the substitution of hydrogen ions for alkaline earth materials therein reduces the concentration of calcium and magnesium in the feed water and produces a higher recovery rate; to provide such a method which improves the quality of the pure water as the membranes reject a fixed percent of solids and the solids in the water being cleaned is reduced therefore the lower solids of the feed stream results in less solids in the purified water; to provide such a method that prevents precipitation of calcium carbonate onto the membranes; and to provide a water cleaning treatment wherein the pH of the feed water is controlled and reduced to desired limits in a simple, economical system that provides clean water at relatively low cost.

Other objects and advantages of this invention will become apparent from the following description taken in connection with the accompanying drawing wherein are set forth by way of illustration and example certain embodiments of this invention. The drawing constitutes a art of this specification and includes an exemplary embodiment illustrating the apparatus on the flow of the process.

FIG. 1 is a diagrammatic view of the water treatment apparatus and flow therethrough.

FIG. 2 is a membrane hydrolysis curve related to pH and temperature of water.

Referring more in detail to the drawing:

As required, detailed embodiments of the invention are disclosed therein; however, it is to be understood that the disclosed embodiments are merely exemplary of the invention which may be embodied in various forms; therefore, specific structural and functional details disclosed herein are not to be interpreted as limiting but merely as a basis for the claim which actually defines the scope of the invention.

In the disclosed embodiment of the structure used in the water cleaning treatment, the reference number 1 designates a flow line connected to a suitable source of water which may be a city water distribution system, a source of natural water, or a return for a waste water from a water use mechanism or system. The flow line 1 provides a stream of water to be treated and as with most natural waters or from other sources the water is alkaline, usually with a pH substantially above 7.0. The flow line 1 is connected to an inlet 2 of a high pressure pump 3 having discharge 4 connected by a flow line 5 to membrane separation structure 6 which may consist of one or more units or modules.

In the illustrated structure there are two modules, 7 and 8 respectively. The membrane modules have a clean water outlet 9 connected to a flow line 10 which leads to a point of delivery, or use. A valve 11 preferably is provided in the line 10 for shutting off flow when desired. Each of the modules 7 and 8 have a shell 12 and a membrane assembly 13 therein arranged whereby water to be treated delivered to an inlet 14 is presented on one side of the membranes of the membrane assemblies and the other side communicates with a collector area 15 that has communication with the outlets 9 to the flow line 10, in the structure illustrated. The inlets 14 of the modular shells 12 are at one end 16 thereof and the opposite end 17 communicates with a discharge line 18 for reject water or concentrate. In the structure illustrated, the line 5 connects to the inlet 14 of the modular unit 7 and the discharge of the reject water therefrom is connected by pipe or flow line 18 with the inlet 14 of the unit 8 and the discharge from the unit 8 is to a discharge line 18'. To provide for re-cycling of the reject water, line 18' has a valve 19 for controlling the flow to a sewer or other waste disposal and between the shell of the unit 8 and the valve 19 there is a return line 20 that communicates with the feed line 1 adjacent to and upstream from the pump 3. Return line 20 has a control valve 21 whereby the operation of the valves 19 and 21 can control the portion of the reject water that is recycled and the portion that is sent to the waste or disposal.

The feed water is preferably passed through a filter 22 for removing some particulate matter, if any, in said water, and for control purposes the line 1 has a valve 23 upstream from the filter 22 for controlling input of the feed water into the system.

In the present invention, the feed water in the line 1 is divided by means of a blending valve 24 located in the line 1 adjacent to and downstream from the filter 22. The blending valve provides for diverting a portion of the feed water to the inlet 26 of a hydrogen exchange unit 27. The outlet 28 of said exchange unit 27 is connected by a pipe or flow line 29 to the pump inlet 2 or line 1 adjacent to said pump inlet. Valves 30 and 31 are shown in the pipes 25 and 29 for controlling flow therethrough and particularly to provide for servicing the hydrogen exchange or substitution unit 27. The valves 30 and 31 are usually fully open and the valve 24 controlled to regulate the proportion of the feed water that is passed through the unit 27 and then re-mixed with the remainder of the feed stream at the pump 3.

The effective life of the cellulose acetate of the membrane assemblies 13 is materially reduced or limited by the alkalinity of the water being treated and with such alkaline water of pH of above 7.0 the acetyl content of the membrane is reduced as the water treatment continues. It has been found that the acetyl reducing effect of the water on the cellulose acetate membrane is reduced or eliminated by lowering the pH of the water contacting the membranes to below 7.0 and preferably to a range of 4.5 to 6.

FIG. 2 of the drawing shows a hydrolysis curve to indicate the effect of pH and temperature on the hydrolysis rate. The hydrolysis curve shows a minimum at a pH of about 4.5 and the hydrolysis is not serious until the pH exceeds 7.0. Actual operation has shown very substantial loss of the effectiveness of the ability of the membranes to remove minerals and the like within a period of three to four weeks of operation when the water contacting same is of about a pH of nine. Also, very low pH can cause acid hydrolysis or degradation of the membrane and such low pH values cause an acid condition in the water product or output to the line 10. Such a condition is undesirable for most applications.

The hydrogen substitution unit 27 is preferably a tank 32 containing a bed 33 cation exchange medium. It is preferred that the medium be a suitable synthetic or organic ionic exchange resin and the following are typical of suitable, weak, acidic cation exchange synthetic resins for use in the present invention: Amberlite IRC-84 obtained from Rohm and Haas Company, Philadelphia, Pa., Dowex CCR-1, manufactured by Dow Chemical Company, Midland, Mich., Duolite ES-80, manufactured by Chemical Process Company, Redwood City, Calif. A strong cation exchange medium may be used in the tank 32 and typical of such resins are Amberlite IRC-120, manufactured by Rohm & Haas, Philadelphia, Pa., and Dowex HCR, manufactured by Dow Chemical Company, Midland, Mich., and Duolite C-20, manufactured by Chemical Process Company, Redwood City, Calif.

In treating water in the present system the feed water is supplied to the flow line 1 and the blending valve 24 adjusted to divert or bypass a desired proportion through the cation exchange resin. This may be as little as 5% or as much as 70% of the feed stream. However, in the treatment of most ordinary waters, the portion of the feed stream contacting the exchange resin may be of 10 to 15%. The diverted portion flows through the bed 33 of cation exchange resin and hydrogen ions are substituted for alkaline earth metal ions. The output of said cation exchange unit 27 flows through line 29 and returns to the feed water stream passing through line 1 to the intake 2 of the pump 3. The combined portions of the feed water is then pumped by the pump 3 under pressure of 50 to 1500 pounds per square inch to the membrane modules 7 whereby said water is passed over the surface of the cellulose acetate membrane in the membrane assemblies therein. The clean water is taken from the other side of the membranes into the area 15 and flowed out of the module through the line 10 to a point of use. With multiples of modules the rejected water, i.e., water that does not pass through the membrane of one unit is flowed to the next unit. The rejected water from the last module is discharged through the line 18' to waste, or by adjusting the valves 19 and 21, a desired proportion thereof may be recycled back to the flow line 1 adjacent to and upstream from the pump 3 for re-cycling through the membrane modules.

In this method a portion of the mineral content of the impure water is converted to acid rather than by adding acid to change the pH. By such conversion, the concentration of calcium and magnesium is reduced, particularly the calcium in the feed water. This produces a higher recovery rate. The concentration of calcium sulfate in the feed stream is frequently the determining factor limiting recovery rate, for example.

Recovery rate=Pure water rate/Input water rate

If the recovery rate is assumed to be 75% the results would be as follows:

Pure water 3 g.p.m./Input water 4 g.p.m.

As the membranes reject a fixed percentage of solids in the feed stream, the lower the solids content of the feed stream results in a lower solids content in the purified stream. In the present invention, a portion of the mineral content is converted by hydrogen substitution and this results in an improved quality of pure water over that obtainable by acid addition. For example, if the pH of a feed stream having 300 p.p.m. mineral salts is adjusted by adding acid, as for example, an addition of 40–50 p.p.m., the acidified water would still have the high solids content. In the present invention, the feed stream having 300 p.p.m. mineral salts is treated to hydrogen substitution and this would provide a feed stream with 250 p.p.m. mineral salts and 50 p.p.m. acid. With this lower solids content the purified stream would also have a proportionate lower solids content. As for example, with a 95% sodium chloride (NaCl) rejection membrane the product stream of pure water would contain 12–15 p.p.m. dissolved solids whereas with the acid addition, the product stream would have 15–18 p.p.m. dissolved solids.

It has also been found that with feed waters containing calcium carbonate and having a pH of more than 7.0, calcium carbonate precipitate can form on the membrane reducing the effectiveness thereof and by the present method of hydrogen substitution in the feed stream, such precipitation is reduced or prevented.

The source of water may change substantially in pH from time to time, and it may be desirable to adjust the valve 24 to vary the proportion that is passed through the cation exchange unit. To illustrate the reduction of pH in the feed stream where different fractions of the feed stream goes through a cation exchange resin bed are the following test examples:

TEST #1

Feed Water—Municipal Water containing approximately 300 p.p.m. dissolved solids.

| | pH of final stream after reblending | |
|---|---|---|
| | Resin IRC-84[1] | Resin IRC-120[1] |
| Percent of feed through resin: | | |
| 0 | 9.0 | 9.0 |
| 9 | 7.4 | 6.8 |
| 23 | 5.4 | 5.3 |
| 37 | 4.7 | 3.3 |

[1] Commercially available.

TEST #2

Feed Water is municipal water containing approximately 300 p.p.m. dissolved solids and 500 p.p.m. sodium chloride added:

|  | pH of final stream after reblending | |
| --- | --- | --- |
|  | Resin IRC-84[1] | Resin IRC-120[1] |
| Percent of feed through resin: |  |  |
| 0 | 8.9 | 8.9 |
| 9 | 6.8 | 5.7 |
| 23 | 6.1 | 3.1 |
| 37 | 5.0 | 2.6 |

[1] Commercially available.

These examples show that even on feed waters of low dissolved solids, the by-passing of 10% of the feed stream through the cation exchange resin reduces a high alkalinity to a relatively safe level. Even when the amount of water being by-passed is increased by 200%, the resulting pH is not dangerously low. Therefore, the present system and pH control functions under a substantial range of variations and provides a pH of the feed water contacting the membranes that is in a safe range for long, effective life of the membranes. The apparatus is economical to operate and the entire system requires virtually no regular preventive maintenance. Also, the treatment provides for desired quality of product water, by varying the permeability of the membranes. The treatment operates at low cost, with little maintenance and more predictable results than with other treating methods. This treatment provides clean water without the use of chemicals, salts and the like and the waste from such operations and thereby reduces pollution that is produced by other systems.

It is to be understood that while the foregoing disclosure is one form of the invention, it is not to be limited to the specific form or arrangement of parts and steps described and shown.

What I claim and desire to secure by Letters Patent is:

1. In the method of cleaning a feed flow of water containing alkaline earth metals and having a pH above 7.0 wherein one side of a cellulose acetate membrane is contacted with the water under pressure and clean water is collected from the other side of the membrane, the improvement which comprises:
   (a) diverting from the feed flow a selected portion of the water;
   (b) contacting the selected portion of the water with a cation exchange media whereby hydrogen ions are substituted for the alkaline earth metals and the concentration of calcium and magnesium of the water is reduced;
   (c) blending the selected portion obtained in (b) with the feed flow whereby the pH of the combined water is within the range of 4.5 and 6.0;
   (d) pumping the combined feed water under pressure to a first membrane module containing cellulose acetate membranes where the combined feed water is passed over one side of the membranes and clear water is taken from the other side of the membranes and flowed out of the first module for use;
   (e) passing the water that does not pass through the membranes of the first module to a second module containing cellulose acetate membranes where the water is passed over one side of the membranes and clear water is taken from the other side of the membranes and flowed out of the second module for use; and
   (f) rejecting the water in (e) that does not pass through the membranes of the second module or recycling a selected portion thereof back to the feed flow.

References Cited
UNITED STATES PATENTS

| | | | |
| --- | --- | --- | --- |
| 3,504,796 | 4/1970 | Bray | 210—137 |
| 1,995,639 | 3/1935 | Henderson | 210—62 |
| 3,501,402 | 3/1970 | Console | 210—38 |
| 3,342,728 | 9/1967 | Malm et al. | 210—23 |
| 3,431,201 | 3/1969 | Johnson et al. | 210—23 |
| 3,639,231 | 2/1972 | Bresler | 210—259 X |

FRANK A. SPEAR, JR., Primary Examiner

U.S. Cl. X.R.

210—259, 321, 433